(12) United States Patent
Lieber et al.

(10) Patent No.: US 10,544,234 B2
(45) Date of Patent: Jan. 28, 2020

(54) FUNCTIONALIZED COPOLYMER RUBBER CONTAINING NITRILE GROUPS

(71) Applicant: ARLANXEO Deutschland GmbH, Dormagen (DE)

(72) Inventors: Susanna Lieber, Kaiserslautern (DE); Karola Schneiders, Bergisch Gladbach (DE); Christoph Kins, Aachen (DE); Werner Obrecht, Moers (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 15/032,373

(22) PCT Filed: Oct. 29, 2014

(86) PCT No.: PCT/EP2014/073240
§ 371 (c)(1),
(2) Date: Apr. 27, 2016

(87) PCT Pub. No.: WO2015/063164
PCT Pub. Date: May 7, 2015

(65) Prior Publication Data
US 2016/0251454 A1 Sep. 1, 2016

(30) Foreign Application Priority Data
Oct. 30, 2013 (EP) .................................... 13190972

(51) Int. Cl.
| | | |
|---|---|---|
| *C08C 19/36* | (2006.01) | |
| *C08C 19/40* | (2006.01) | |
| *C08F 236/12* | (2006.01) | |
| *C08C 19/02* | (2006.01) | |
| *C08J 3/24* | (2006.01) | |

(52) U.S. Cl.
CPC ............. *C08C 19/36* (2013.01); *C08C 19/02* (2013.01); *C08F 236/12* (2013.01); *C08J 3/247* (2013.01); *C08C 19/40* (2013.01); *C08J 2309/02* (2013.01)

(58) Field of Classification Search
CPC ........ C08C 19/02; C08C 19/36; C08C 19/40; C08F 236/06; C08F 236/12; C08L 9/02; C08L 15/005; C08J 3/24; C08J 3/247; C08J 2309/02
See application file for complete search history.

(56) References Cited

U.S. PATENT DOCUMENTS

| | | |
|---|---|---|
| 3,700,637 A | 10/1972 | Finch, Jr. |
| 4,101,273 A | 7/1978 | Matsuba et al. |
| 4,337,329 A | 6/1982 | Kubo et al. |
| 4,384,081 A | 5/1983 | Kubo et al. |
| 4,452,951 A | 6/1984 | Kubo et al. |
| 4,464,515 A | 8/1984 | Rempel et al. |
| 4,503,196 A | 3/1985 | Rempel et al. |
| 4,581,417 A | 4/1986 | Buding et al. |
| 4,643,938 A | 2/1987 | Oyama et al. |
| 4,721,496 A | 1/1988 | Yokoyama et al. |
| 4,762,745 A | 8/1988 | Mashimo et al. |
| 5,084,514 A | 1/1992 | Szczechura et al. |
| 5,739,203 A | 4/1998 | Ngoc |
| 6,548,604 B1 | 4/2003 | Kotsuji et al. |
| 6,657,014 B1 | 12/2003 | Mori et al. |
| 6,812,312 B1 | 11/2004 | Ito et al. |
| 7,354,977 B1 | 4/2008 | Woods et al. |
| 9,163,136 B2 | 10/2015 | Sakamoto et al. |
| 9,650,452 B2 | 5/2017 | Brandau et al. |
| 2010/0029857 A1 | 2/2010 | Soddemann et al. |
| 2010/0048803 A1* | 2/2010 | Tsuneyoshi ........... C08F 265/08 524/555 |
| 2010/0152365 A1 | 6/2010 | Han et al. |
| 2010/0240848 A1 | 9/2010 | Guerin et al. |
| 2011/0237717 A1 | 9/2011 | Soddemann et al. |
| 2012/0214945 A1 | 8/2012 | Emori |
| 2013/0085227 A1 | 4/2013 | Luo et al. |
| 2013/0280459 A1 | 10/2013 | Nakashima et al. |
| 2014/0114025 A1* | 4/2014 | Brandau ............... C08K 5/0091 525/327.3 |
| 2014/0114026 A1* | 4/2014 | Brandau ............... C08K 5/0091 525/329.3 |
| 2014/0378618 A1 | 12/2014 | Brandau et al. |
| 2015/0203675 A1 | 7/2015 | Kalkofen et al. |
| 2016/0257773 A1* | 9/2016 | Obrecht ................ C08F 236/06 |

FOREIGN PATENT DOCUMENTS

| | | | |
|---|---|---|---|
| DE | 19921415 A1 | | 11/2000 |
| JP | 2012-031311 A | | 8/2013 |
| WO | WO 2012/089804 | * | 7/2012 |
| WO | WO 2012/089817 | * | 7/2012 |

OTHER PUBLICATIONS

Ullmann's Encyclopedia of Industrial Chemistry, VCH Verlagsgesellschaft mbH, D-69451 Weinheim, 1993, vol. A 23 "Chemicals and Additives", pp. 366-417.
European Search Report from co-pending Application EP13190972 dated Apr. 15, 2014 4 pages.

* cited by examiner

*Primary Examiner* — Roberto Rabago
(74) *Attorney, Agent, or Firm* — Norris McLaughlin, PA

(57) ABSTRACT

The present invention relates to functionalized copolymer rubbers containing nitrile groups and to the preparation thereof, to vulcanizable mixtures comprising functionalized copolymer rubbers containing nitrile groups and to the preparation thereof, and to vulcanizates based on functionalized copolymer rubbers containing nitrile groups, to the preparation thereof and to the use thereof as technical material.

16 Claims, No Drawings

FUNCTIONALIZED COPOLYMER RUBBER CONTAINING NITRILE GROUPS

The present invention relates to functionalized copolymer rubbers containing nitrile groups, to the preparation thereof, to vulcanizable mixtures comprising functionalized copolymer rubbers containing nitrile groups and to the preparation thereof, and to vulcanizates based on functionalized copolymer rubbers containing nitrile groups, to the preparation thereof and to the use thereof as technical material.

Copolymer rubbers containing nitrile groups (nitrile rubber, also abbreviated to "NBR") are understood to mean rubbers which are co-, ter- or quaterpolymers of at least one $\alpha,\beta$-ethylenically unsaturated nitrile, at least one conjugated diene and optionally one or more additional copolymerizable monomers. This explicitly also includes partly or fully hydrogenated copolymer rubbers containing nitrile groups ("HNBR"). Hydrogenated copolymer rubber containing nitrile groups is understood to mean corresponding co-, ter- or quaterpolymers in which all or some of the C=C double bonds of the copolymerized diene units have been hydrogenated.

For many years, both NBR and HNBR have occupied an established position in the specialty elastomers sector. They possess an excellent profile of properties, in the form of excellent oil resistance, good heat stability and excellent resistance to ozone and chemicals, the latter being even more pronounced in the case of HNBR than in the case of NBR. NBR and HNBR also have very good mechanical and performance properties. For this reason, they are widely used in a wide variety of different fields of use, and are used, for example, for production of gaskets, hoses, belts and damping elements in the automotive sector, and also for stators, well seals and valve seals in the oil production sector, and also for numerous parts in the electrical industry, mechanical engineering and shipbuilding. One of the main uses of HNBR is in drive belts. Examples of reinforced belts consisting of hydrogenated nitrile rubber are disclosed, inter alia, in U.S. Pat. Nos. 4,643,938, 4,762,745 and 4,721,496. In the automobile industry, there is a trend in the direction of using internal belts rather than metal chains or external drives, in order to enable more compact designs of the engine with lower weights. These belts work directly in the engine oil, the maximum possible temperatures in the engine space being up to 150° C. In order to enable trouble-free operation of the engine, the belt should have only minimal oil swelling. At the same time, it is desirable for the belt to have very good low-temperature flexibility down to −35° C. The latter prevents the rupture of the belt when the engine is started at low temperatures. A multitude of different HNBR types are commercially available, and these feature, according to the application sector, different monomers, molecular weights, polydispersities and mechanical and physical properties. As well as the standard types, there is increasing demand particularly for specialty types featuring contents of specific termonomers or particular functionalizations.

Thus, the market for carboxylated nitrile rubber (XNBR), a terpolymer based on at least one $\alpha,\beta$-unsaturated nitrile, at least one conjugated diene and at least one monomer containing carboxyl groups, in the case of industrial rubber articles is traditionally in the fields of industrial drive technology, conveying technology, the textile industry, seals in the automotive and industrial sectors, and other specialty applications.

The particular properties of XNBR, such as
- very low abrasion and good wear resistance,
- excellent vulcanizate properties in relation to strength and stress values,
- excellent binding to polar substrates as a result of a possible reaction of the substrate with the carboxyl group of the termonomer and
- hydrophilicity, which is likewise attributable to the repeat units of the termonomer containing carboxyl groups, have for many years enabled coverage of some important fields of use by XNBR.

The prior art discloses numerous copolymer rubbers containing nitrile groups, and processes for preparation thereof.

For example, EP 2145920 A1 discloses a vulcanizable polymer composition containing diene monomers, nitrile monomers and various termonomers, for example carboxylic acids and esters thereof, which is characterized by a specific combination of polyamine crosslinking agents and specific crosslinking accelerators. Polymer vulcanizates based on such polymer compositions and processes for production of such polymer vulcanizates have been described, especially mouldings.

WO 2013/073660 A discloses a crosslinkable nitrile rubber containing carboxyl groups, containing an allylamine-based polymer having good mechanical properties, oil resistance and low-temperature stability.

JP 2012-031311 A describes a highly saturated copolymer rubber containing nitrile groups, containing (a) 10.0% to 40.0% by weight of $\alpha,\beta$-ethylenically unsaturated nitrile units, (b) 5.5% to 10.0% by weight of $\alpha,\beta$-ethylenically unsaturated dicarboxylic acid monoester units, (c) 11.0% to 30.0% by weight of alkoxyalkyl ester (meth)acrylate units having alkoxyalkyl groups having 2 to 8 carbon atoms, and (d) 20.0% to 73.5% by weight of conjugated diene units, where at least a portion of the conjugated diene units has been hydrogenated.

EP 1247835 A discloses a highly saturated copolymer rubber containing nitrile groups, containing (a) 10% to 40% by weight of $\alpha,\beta$-ethylenically unsaturated nitrile units, (b) 10% to 60% by weight of $\alpha,\beta$-ethylenically unsaturated carboxylic ester units, (c) 0.01% to 21% by weight of conjugated diene units and (d) 14% to 69.99% by weight of saturated conjugated diene units, where the sum total of the monomer units (c) and (d) is 20% to 70% by weight, and the ratio of the monomer units (d)/[(c)+(d)] is at least 70% by weight and the difference between the extrapolated glass transition initiation temperature (Tig) and the extrapolated glass transition end temperature (Teg) is not greater than 10° C. Vulcanized products of the copolymer rubber have good cold stability and oil resistance, and good dynamic properties.

In addition, EP 1243602 A discloses a terpolymer containing (a) 0% to 20% by weight of 1,3-butadiene units, (b) 0% to 50% by weight of saturated 1,3-butadiene units, (c) 40% to 50% by weight of $\alpha,\beta$-ethylenically unsaturated nitrile units, and (d) 10% to 35% by weight and at least 8 mol % of other monomer units, where the sum total of the 1,3-butadiene units (a) and the saturated 1,3-butadiene units (b) is in the range from 30% to 50% by weight. This highly saturated copolymer rubber containing nitrile groups has good oil resistance in the vulcanized product. Examples of terpolymers having a low termonomer content of 3% and 8% by weight of butyl acrylate are disclosed as comparative examples.

EP 1234851 A1 describes a crosslinkable rubber composition containing (a) 100 pbw of a highly saturated copolymer rubber containing nitrile groups and containing ethylenically unsaturated dicarboxylic acid monoalkyl ester units, (b) 0.5 to 10 pbw of a polyamine crosslinking component and (c) 0.5 to 10 pbw of a basic crosslinking accelerator. The crosslinked polymer has excellent heat resistance, flex fatigue resistance and elongation, and reduced permanent set.

WO 1998/31655 A describes a process for hydroxyalkylation of terminal carboxylic acid groups. The document thus describes the preparation of hydroxyl-functionalized materials, for example butadiene-nitrile polymers, from carboxyl-functionalized materials, for example butadiene-nitrile polymers using a carboxyl carbonate, for example ethylene carbonate, or a carboxyl sulphite, for example ethylene sulphite.

DE 19921415 A describes a process for producing polymer mixtures, especially thermoplastic elastomer compositions, using glycidyl-functionalized nitrile rubbers.

WO 2010/085622 A describes a method for preparing functionalized polymers, comprising the steps of (i) polymerizing the monomers with a coordination catalyst to prepare reactive polymers and (ii) reacting the reactive polymer with a nitrile component containing a protected amino group.

The existing types of copolymer rubbers containing nitrile groups only partly meet the requirement for minimal oil swelling and very good low-temperature flexibility, since oil swelling and low-temperature flexibility (glass transition temperature Tg) cannot be adjusted independently of one another. Typically, there are relationships in HNBR between the ACN content, the glass transition temperature and the oil swelling. This means that there is a decrease in oil swelling with rising ACN content, i.e. elevated polarity. At the same time, however, there is a rise in glass transition temperature. Past attempts to achieve a reduction in the glass transition temperature with constant oil swelling or a reduction in oil swelling with constant glass transition temperature through incorporation of various termonomers have been unsuccessful. Therefore, the known terpolymers are still unsatisfactory for particular end uses.

Accordingly, one of the problems addressed by the present invention was that of providing a copolymer rubber containing nitrile groups which has a balance of good low-temperature stability and/or oil resistance, which overcomes the disadvantages of the prior art.

The solution to the problem and the subject-matter of the present invention is a copolymer rubber containing nitrile groups, comprising
a) 10% to 60% by weight, preferably 20% to 50% by weight and more preferably 34% to 43% by weight of an α,β-ethylenically unsaturated nitrile unit,
b) 31% to 89.0% by weight, preferably 42% to 78.75% by weight and more preferably 49% to 64.5% by weight of a conjugated diene unit and
c) 1% to 9% by weight, preferably 1.25% to 8% by weight and more preferably 1.5% to 8% by weight of at least one α,β-ethylenically unsaturated monomer unit containing carbonyl groups, selected from the group consisting of
α,β-ethylenically unsaturated monocarboxylic acid monoester units,
α,β-ethylenically unsaturated dicarboxylic acid monoester units,
α,β-ethylenically unsaturated dicarboxylic acid diester units and
α,β-ethylenically unsaturated carboxamide units.

Another preferred inventive embodiment of the present invention is a copolymer rubber containing nitrile groups, comprising a) 10% to 60% by weight, preferably 20% to 50% by weight and more preferably 34% to 43% by weight of an α,β-ethylenically unsaturated nitrile unit,
b) 31% to 89% by weight, preferably 42% to 78.75% by weight and more preferably 49% to 64.5% by weight of a conjugated diene unit and
c) 1% to 9% by weight, preferably 1.25% to 8% by weight and more preferably 1.5% to 8% by weight of at least one α,β-ethylenically unsaturated monomer unit containing carbonyl groups, selected from the group consisting of
α,β-ethylenically unsaturated monocarboxylic acid monoester units,
α,β-ethylenically unsaturated dicarboxylic acid monoester units and
α,β-ethylenically unsaturated dicarboxylic acid diester units.

In an alternative embodiment of the invention, at least some of the conjugated diene units have been hydrogenated.

It should be noted at this point that the scope of the invention includes any and all possible combinations of the components, ranges of values and/or process parameters mentioned above and cited hereinafter, in general terms or within areas of preference.

The term copolymer encompasses polymer having more than one monomer unit. In one embodiment of the invention, the copolymer is derived exclusively, for example, from the three monomer types (a), (b) and (c) described, and is therefore a terpolymer. The term "copolymer" likewise encompasses, for example, additionally quaterpolymers, derived from the three monomer types (a), (b) and (c) described and a further monomer unit.

α,β-Ethylenically Unsaturated Nitrile

The α,β-ethylenically unsaturated nitrile used, which forms the α,β-ethylenically unsaturated nitrile units (a), may be any known α,β-ethylenically unsaturated nitrile. Preference is given to ($C_3$-$C_5$)-α,β-ethylenically unsaturated nitriles such as acrylonitrile, α-haloacrylonitrile, for example α-chloroacrylonitrile and α-bromoacrylonitrile, α-alkylacrylonitrile, for example methacrylonitrile, ethacrylonitrile or mixtures of two or more α,β-ethylenically unsaturated nitriles. Particular preference is given to acrylonitrile, methacrylonitrile, ethacrylonitrile or mixtures. Very particular preference is given to acrylonitrile.

The amount of α,β-ethylenically unsaturated nitrile units (a) is typically in the range from 10% to 60% by weight, preferably 20% to 50% by weight, more preferably from 34% to 43% by weight, based on the total amount of 100% by weight of all the monomer units.

Conjugated Diene

The conjugated diene, which forms the conjugated diene unit (b), may be of any type, especially conjugated $C_4$-$C_{12}$ dienes. Particular preference is given to 1,3-butadiene, isoprene, 2,3-dimethylbutadiene, 1,3-pentadiene (piperylene) or mixtures thereof. Especially preferred are 1,3-butadiene and isoprene or mixtures thereof. Very particular preference is given to 1,3-butadiene.

The amount of conjugated diene is typically in the range from 31% to 89.0% by weight, preferably 42% to 78.75% by weight and more preferably 49% to 64.5% by weight, based on the total amount of 100% by weight of all the monomer units.

α,β-Ethylenically Unsaturated Monomer Unit Containing Carbonyl Groups

In addition to the α,β-ethylenically unsaturated nitrile units and the conjugated diene units, the functionalized copolymer rubber containing nitrile groups includes, as a third monomer, α,β-ethylenically unsaturated monomer units containing carbonyl groups selected from the group consisting of

- α,β-ethylenically unsaturated monocarboxylic acid monoester units,
- α,β-ethylenically unsaturated dicarboxylic acid monoester units,
- α,β-ethylenically unsaturated dicarboxylic acid diester units and
- α,β-ethylenically unsaturated carboxamide units.

α,β-Ethylenically unsaturated monocarboxylic acid monoester units may, for example, be those derived from (meth)acrylates [(meth)acrylates in the context of this invention represents "acrylates" and "methacrylates"] and derivatives or mixtures thereof.

Preferred monomers for the α,β-ethylenically unsaturated monocarboxylic acid monoester units are as follows:

alkyl (meth)acrylates, especially $C_4$-$C_{20}$-alkyl (meth)acrylates, n-butyl (meth)acrylate, tert-butyl (meth)acrylate, hexyl (meth)acrylate, 2-ethylhexyl (meth)acrylate, octyl (meth)acrylate, 2-propylheptyl acrylate and n-dodecyl (meth)acrylate, alkoxyalkyl (meth)acrylates, especially $C_1$-$C_{18}$-alkoxyalkyl (meth)acrylates, preferably methoxymethyl (meth)acrylate, methoxyethyl (meth)acrylate, ethoxyethyl (meth)acrylate, ethoxymethyl (meth)acrylate, aryl (meth)acrylates, especially $C_6$-$C_{14}$-aryl (meth)acrylates, preferably $C_6$-$C_{10}$-aryl (meth)acrylates, cycloalkyl (meth)acrylates, especially $C_5$-$C_{12}$-cycloalkyl (meth)acrylates, preferably $C_6$-$C_{12}$-cycloalkyl (meth)acrylates, cyanoalkyl (meth)acrylates, especially $C_4$-$C_{18}$-cyanoalkyl (meth)acrylates, preferably α-cyanoethyl (meth)acrylate, β-cyanoethyl (meth)acrylate and cyanobutyl (meth)acrylate, hydroxyalkyl (meth)acrylates, especially $C_4$-$C_{18}$-hydroxyalkyl (meth)acrylates, preferably 2-hydroxyethyl (meth)acrylate, 3-hydroxypropyl (meth)acrylate and 4-hydroxybutyl (meth)acrylate, fluorine-substituted (meth)acrylate containing benzyl groups, preferably fluorobenzyl (meth)acrylate, (meth)acrylate containing fluoroalkyl groups, preferably trifluoroethyl (meth)acrylate, and (meth)acrylate containing aminoalkyl groups, such as dimethylaminomethyl acrylate and diethylaminoethyl acrylate.

Further preferred α,β-ethylenically unsaturated monocarboxylic acid monoester units are those derived from polyethylene glycol (meth)acrylate, polypropylene glycol (meth)acrylate, polyethylene-propylene (meth)acrylate, glycidyl (meth)acrylate, epoxy (meth)acrylate, or urethane (meth)acrylate, more preferably methoxy or ethoxy polyethylene glycol (meth)acrylates having 1 to 15 repeat ethylene glycol units, most preferably methoxy or ethoxy polyethylene glycol (meth)acrylates having 1 to 7 repeat ethylene glycol units.

Preferred α,β-ethylenically unsaturated mono- or dicarboxylic acid monoester units are those of the general formula (I)

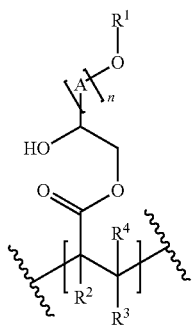

where
$R^1$ is hydrogen, branched or unbranched $C_1$-$C_{18}$-alkyl, preferably methyl, ethyl, butyl or 2-ethylhexyl, aryl, preferably $C_6$-$C_{14}$-aryl, cycloalkyl, preferably $C_3$-$C_{18}$-cycloalkyl, cyanoalkyl, preferably $C_1$-$C_{18}$-cyanoalkyl, hydroxyalkyl, preferably $C_1$-$C_{18}$-hydroxyalkyl, aminoalkyl, preferably $C_1$-$C_{18}$ aminoalkyl, polyethylene glycol radical, preferably methoxy or ethoxy polyethylene glycol radical having 1 to 20 repeat ethylene glycol units, most preferably methoxy or ethoxy polyethylene glycol radical having 1 to 7 repeat ethylene glycol units, $R^2$, $R^3$ and $R^4$ are each independently hydrogen, alkyl, preferably $C_1$-$C_{20}$-alkyl, more preferably $C_1$-$C_4$-alkyl, most preferably methyl or ethyl, or a carboxyl group, A is —$CH_2$,
n is 1 to 18, preferably 1 to 6, more preferably 1.

Preferred α,β-ethylenically unsaturated dicarboxylic acid monoester units are those of the general formula (I)
where
$R^1$ is hydrogen, branched or unbranched $C_1$-$C_{15}$-alkyl, preferably methyl, ethyl, butyl or 2-ethylhexyl, aryl, preferably $C_6$-$C_{14}$-aryl, cycloalkyl, preferably $C_3$-$C_{18}$-cycloalkyl, cyanoalkyl, preferably $C_1$-$C_{18}$-cyanoalkyl, hydroxyalkyl, preferably $C_1$-$C_{18}$-hydroxyalkyl, aminoalkyl, preferably $C_1$-$C_{18}$ aminoalkyl, polyethylene glycol radical, preferably methoxy or ethoxy polyethylene glycol radical having 1 to 20 repeat ethylene glycol units, most preferably methoxy or ethoxy polyethylene glycol radical having 1 to 7 repeat ethylene glycol units, $R^2$ and $R^3$ are each independently hydrogen, alkyl, preferably $C_1$-$C_{20}$-alkyl, more preferably $C_1$-$C_4$-alkyl, most preferably methyl or ethyl, $R^4$ is a carboxyl group,
A is —$CH_2$, and
n is 1 to 18, preferably 1 to 6, more preferably 1.

Examples of further preferred α,β-ethylenically unsaturated dicarboxylic acid monoester units are those derived from monoalkyl maleates, preferably monomethyl maleate, monoethyl maleate,
monopropyl maleate, and mono-n-butyl maleate;
monocycloalkyl maleates, preferably monocyclopentyl maleate, monocyclohexyl maleate and monocycloheptyl maleate;
monoalkylcycloalkyl maleates, preferably monomethylcyclopentyl maleate and monoethylcyclohexyl maleate;
monoaryl maleates, preferably monophenyl maleate;
monobenzyl maleates, preferably monobenzyl maleate;
monoalkyl fumarates, preferably monomethyl fumarate, monoethyl fumarate, monopropyl fumarate and mono-n-butyl fumarate;

monocycloalkyl fumarates, preferably monocyclopentyl fumarate, monocyclohexyl fumarate and monocycloheptyl fumarate;

monoalkylcycloalkyl fumarates, preferably monomethylcyclopentyl fumarate and monoethylcyclohexyl fumarate;

monoaryl fumarates, preferably monophenyl fumarate;

monobenzyl fumarates, preferably monobenzyl fumarate;

monoalkyl citraconates, preferably monomethyl citraconate, monoethyl citraconate, monopropyl citraconate and mono-n-butyl citraconate;

monocycloalkyl citraconates, preferably monocyclopentyl citraconate, monocyclohexyl citraconate and monocycloheptyl citraconate;

monoalkylcycloalkyl citraconates, preferably monomethylcyclopentyl citraconate and monoethylcyclohexyl citraconate;

monoaryl citraconates, preferably monophenyl citraconate;

monobenzyl citraconates, preferably monobenzyl citraconate;

monoalkyl itaconates, preferably monomethyl itaconate, monoethyl itaconate, monopropyl itaconate and mono-n-butyl itaconate;

monocycloalkyl itaconates, preferably monocyclopentyl itaconate, monocyclohexyl itaconate and monocycloheptyl itaconate;

monoalkylcycloalkyl itaconates, preferably monomethylcyclopentyl itaconate and monoethylcyclohexyl itaconate;

monoaryl itaconates, preferably monophenyl itaconate;

monobenzyl itaconates, preferably monobenzyl itaconate.

α,β-Ethylenically unsaturated dicarboxylic acid diesters may be the analogous diesters based on the aforementioned monoester groups, where the ester groups may also be chemically different (mixed) esters.

Preferred α,β-ethylenically unsaturated dicarboxylic acid diesters are those of the general formula (II)

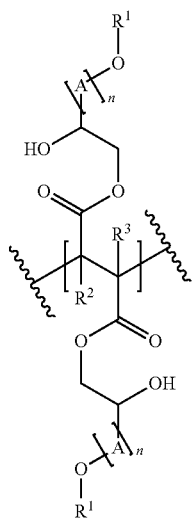

(II)

where $R^1$ is hydrogen, branched or unbranched $C_1$-$C_{18}$-alkyl, preferably methyl, ethyl, butyl or 2-ethylhexyl, aryl, preferably $C_6$-$C_{14}$-aryl, cycloalkyl, preferably $C_3$-$C_{18}$-cycloalkyl, cyanoalkyl, preferably $C_1$-$C_{18}$-cyanoalkyl, hydroxyalkyl, preferably $C_1$-$C_{18}$-hydroxyalkyl, aminoalkyl, preferably $C_1$-$C_{18}$ aminoalkyl, polyethylene glycol radical, preferably methoxy or ethoxy polyethylene glycol radical having 1 to 20 repeat ethylene glycol units, most preferably methoxy, ethoxy or hydroxy polyethylene glycol radical having 1 to 7 repeat ethylene glycol units, $R^2$ and $R^3$ are each independently hydrogen, alkyl, preferably $C_1$-$C_{20}$-alkyl, more preferably $C_1$-$C_4$-alkyl, most preferably methyl or ethyl, A is —$CH_2$, n is 1 to 18, preferably 1 to 6, more preferably 1.

α,β-Ethylenically unsaturated carboxamide units may, for example, be those derived from N-(2-hydroxyethyl)acrylamide or N-(hydroxymethyl)acrylamide.

Preferred α,β-ethylenically unsaturated carboxamide units are those of the general formula (III)

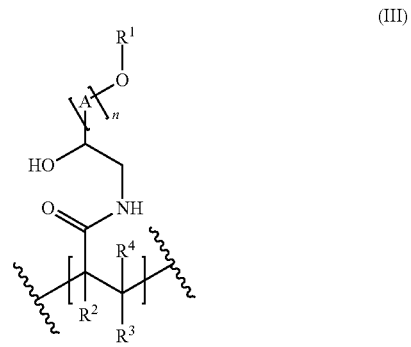

(III)

where $R^1$ is hydrogen, branched or unbranched $C_1$-$C_{18}$-alkyl, preferably methyl, ethyl, butyl or 2-ethylhexyl, aryl, preferably $C_6$-$C_{14}$-aryl, cycloalkyl, preferably $C_3$-$C_{18}$-cycloalkyl, cyanoalkyl, preferably $C_1$-$C_{18}$-cyanoalkyl, hydroxyalkyl, preferably $C_1$-$C_{18}$-hydroxyalkyl, aminoalkyl, preferably $C_1$-$C_{16}$ aminoalkyl, polyethylene glycol radical, preferably methoxy, ethoxy or hydroxy polyethylene glycol radical having 1 to 20 repeat ethylene glycol units, most preferably methoxy, ethoxy or hydroxy polyethylene glycol radical having 1 to 7 repeat ethylene glycol units, $R^2$, $R^3$ and $R^4$ are each independently hydrogen, alkyl, preferably $C_1$-$C_{20}$-alkyl, more preferably $C_1$-$C_4$-alkyl, most preferably methyl or ethyl, A is —$CH_2$, and n is 1 to 18, preferably 1 to 6, more preferably 1.

The amount of the α,β-ethylenically unsaturated monomer units containing carbonyl groups is typically in the range from 1% to 9% by weight, preferably 1.25% to 8% by weight, more preferably 1.5% to 8% by weight, based on the total amount of 100% by weight of all the monomer units.

A preferred inventive copolymer rubber containing nitrile groups includes as α,β-ethylenically unsaturated nitrile unit (a) acrylonitrile or methacrylonitrile, more preferably acrylonitrile, as conjugated diene unit (b) isoprene or 1,3-butadiene, more preferably 1,3-butadiene, and as α,β-ethylenically unsaturated monomer unit (c) containing carbonyl groups one selected from the group consisting of α,β-ethylenically unsaturated monocarboxylic acid monoester units, α,β-ethylenically unsaturated dicarboxylic acid diester units and α,β-ethylenically unsaturated carboxamide, more preferably selected from the group consisting of butyl acrylate, methoxyethyl methacrylate and polyethylene glycol (meth)acrylate, especially polyethylene glycol (meth) acrylate having 7 repeat ethylene glycol units.

In addition, the copolymer rubber containing nitrile groups may contain one or more further copolymerizable monomers in an amount of 0.1% to 10% by weight, preferably 0.1% to 5% by weight. In that case, the amounts of the other monomer units are reduced in a suitable manner, such that the sum total is always 100% by weight. Further copolymerizable monomers which may be used are, for example, aromatic vinyl monomers, preferably styrene, α,β-styrene, α-methylstyrene and vinylpyridine, fluorinated vinyl monomers, preferably fluoroethyl vinyl ether, fluoropropyl vinyl ether, o-fluoromethylstyrene, vinyl pentafluorobenzoate, difluoroethylene and tetrafluoroethylene, or else α-olefine, preferably $C_2$-$C_{12}$ olefins, for example ethylene, 1-butene, 4-butene, 4-methyl-1-pentene, 1-hexene or 1-octene, non-conjugated dienes, preferably $C_4$-$C_{12}$ dienes such as 1,4-pentadiene, 1,4-hexadiene, 4-cyanocyclohexene, 4-vinylcyclohexene, vinylnorbonene, dicyclopentadiene or else alkynes such as 1- or 2-butyne, α,β-ethylenically unsaturated monomer units containing carbonyl groups other than the aforementioned α,β-ethylenically unsaturated monomer units containing carbonyl groups, for instance carboxylic acid units, for example acrylic acid, methacrylic acid, crotonic acid or cinnamic acid, polycarboxylic acids, for example maleic acid, fumaric acid, itaconic acid;

copolymerizable antioxidants, for example N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy) aniline, N-phenyl-4-(4-vinylbenzyloxy)aniline or crosslinkable monomers, for example divinyl components, for example divinylbenzene; di(meth)acrylic esters, for example ethylene glycol di(meth)acrylate, diethylene glycol di(meth)acrylate, butanediol di(meth) acrylate or polyethylene glycol di(meth)acrylate, or tri(meth)acrylic esters, for example trimethylolpropane tri(meth)acrylate; self-crosslinkable monomers, for example N-methylol(meth)acrylamide or N,N'-dimethylol(meth)acrylamide.

The inventive functionalized copolymer rubber containing nitrile groups typically has a number-average molecular weight (Mn) of 10 000 to 2 000 000 g/mol, preferably 50 000 to 1 000 000 g/mol, more preferably 100 000 to 500 000 g/mol and most preferably 150 000 to 300 000 g/mol.

The inventive functionalized copolymer rubber containing nitrile groups typically has a polydispersity index (PDI=$M_w$/$M_n$ where $M_w$ is the weight-average molecular weight) of 1.5 to 6, preferably 2 to 5 and more preferably 2.5 to 4.

The inventive functionalized copolymer rubber containing nitrile groups typically has a Mooney viscosity (ML1+4@100° C.) of 10 to 150, preferably of 20 to 120 and more preferably of 25 to 100.

The Inventive functionalized copolymer rubber containing nitrile groups is characterized in that the glass transition temperature, measured by the test method specified in the description, is lower than −20° C., preferably lower than −23° C. and more preferably lower than −25° C., or the oil swelling, measured by the test method specified in the description, is not more than 20%, preferably not more than 18% and more preferably not more than 15%, or the glass transition temperature, measured by the test method specified in the description, is lower than −20° C., preferably lower than −23° C. and more preferably lower than −25° C., and the oil swelling, measured by the test method specified in the description, is not more than 20%, preferably not more than 18% and more preferably not more than 15%.

Process for Preparing Functionalized Copolymer Rubbers Containing Nitril Groups (Functionalization)

The invention further relates to a process for preparing the inventive functionalized copolymer rubbers containing nitrile groups, comprising a) 10% to 60% by weight, preferably 20% to 50% by weight and more preferably 34% to 43% by weight of an α,β-ethylenically unsaturated nitrile unit, b) 31% to 89.0% by weight, preferably 42% to 78.75% by weight and more preferably 49% to 64.5% by weight of a conjugated diene unit and c) 1% to 9% by weight, preferably 1.25% to 8% by weight and more preferably 1.5% to 8% by weight of at least one α,β-ethylenically unsaturated monomer unit containing carbonyl groups, selected from the group consisting of α,β-ethylenically unsaturated monocarboxylic acid monoester units, α,β-ethylenically unsaturated dicarboxylic acid monoester units, α,β-ethylenically unsaturated dicarboxylic acid diester units and α,β-ethylenically unsaturated carboxamide units, by reacting functionalizable copolymer rubbers containing carbonyl groups and nitrite groups with alcohols, epoxides or amines.

In a preferred embodiment, the invention relates to a process for preparing the inventive functionalized copolymer rubbers containing nitrile groups, comprising a) 10% to 60% by weight, preferably 20% to 50% by weight and more preferably 34% to 43% by weight of an α,β-ethylenically unsaturated nitrile unit, b) 31% to 89.0% by weight, preferably 42% to 78.75% by weight and more preferably 49% to 64.5% by weight of a conjugated diene unit and c) 1% to 9% by weight, preferably 1.25% to 8% by weight and more preferably 1.5% to 8% by weight of at least one α,β-ethylenically unsaturated monomer unit containing carbonyl groups, selected from the group consisting of α,β-ethylenically unsaturated monocarboxylic acid monoester units, α,β-ethylenically unsaturated dicarboxylic acid monoester units, α,β-ethylenically unsaturated dicarboxylic acid diester units and α,β-ethylenically unsaturated carboxamide units, by reacting functionalizable copolymer rubbers containing carbonyl groups and nitrite groups with alcohols, epoxides or amines.

The reaction is effected typically to an extent of more than 80%, more preferably to an extent of more than 90% and most preferably to completion.

The functionalizable copolymer rubbers containing carbonyl groups and nitrite groups are copolymers including one or more monomers containing carboxyl groups or one or more monomers containing $C_1$-$C_3$ carboxylate groups or one or more monomers containing amide groups or mixtures thereof.

The functionalizable copolymer rubbers containing carbonyl groups and nitrile groups usable for the functionalization comprise
- repeat units of at least one α,β-ethylenically unsaturated nitrile (a) in amounts of 10% to 60% by weight, preferably of 20% to 50% by weight and more preferably of 34% to 43% by weight, based on the total amount of 100% by weight of all the monomer units,
- repeat units of at least one conjugated diene (b) in amounts of 31% to 89.0% by weight, preferably of 42% to 78.75% by weight, more preferably 49% to 64.5% by weight, based on the total amount of 100% by weight of all the monomer units,
- repeat units of at least one α,β-ethylenically unsaturated monomer containing carbonyl groups in amounts of 1% to 9% by weight, preferably of 1.25% to 8% by weight and more preferably of 1.5% to 8% by weight, based on the total amount of 100% by weight of all the monomer units, selected from the group consisting of
    α,β-ethylenically unsaturated monocarboxylic acid units,
    α,β-ethylenically unsaturated monocarboxylic acid $C_1$-$C_3$-monoalkyl ester units,
    α,β-ethylenically unsaturated dicarboxylic acid units,
    α,β-ethylenically unsaturated dicarboxylic acid $C_1$-$C_3$-monoalkyl ester units, and
    α,β-ethylenically unsaturated carboxamide units,
where the sum total of all the repeat units is 100% by weight.

Preferred α,β-unsaturated monocarboxylic acids are acrylic acid and methacrylic acid.

Preferred α,β-unsaturated monocarboxylic acid $C_1$-$C_3$-monoalkyl esters are methyl, ethyl or propyl esters of acrylic acid or methacrylic acid.

Preferred α,β-unsaturated dicarboxylic acids are maleic acid, fumaric acid, crotonic acid, itaconic acid, citraconic acid and mesaconic acid.

Preferred α,β-ethylenically unsaturated dicarboxylic acid monoesters are methyl, ethyl or propyl monoesters of maleic acid, fumaric acid, crotonic acid, itaconic acid, citraconic acid and mesaconic acid.

The functionalizable copolymer rubber containing carbonyl groups and nitrile groups may, in an alternative embodiment, also be functionalized in its hydrogenated form.

In an alternative embodiment, the level of hydrogenation of the conjugated diene units is 50% or more, preferably 75% or more and more preferably 85% or more.

The preparation of such functionalizable copolymer rubbers containing carbonyl groups and nitrile groups (HXNBR) is described in WO-A 01/77185. HXNBR rubber is prepared proceeding from XNBR by hydrogenation in a solution process, and can be converted to solid rubber at a later stage. The monomer units may be distributed either randomly or in blocks. Preference is given to a random distribution. Alternatively, such functionalizable copolymer rubbers containing carbonyl groups and nitrile groups are preparable by the methods known to those skilled in the art, for example by terpolymerization in emulsion.

Such functionalizable copolymer rubbers containing carbonyl groups and nitrile groups are commercially available, for example under the Therban®XT brand from Lanxess Deutschland GmbH or under the Krynac® brand from Lanxess Deutschland GmbH (e.g. Krynac® X 750 and Krynac® X 740 with 7% by weight of carboxylic acid monomer; Krynac® X 146 with 1% by weight of carboxylic acid monomer and Krynac® X 160 with 1% by weight of carboxylic acid monomer).

In addition, mixtures in which the carboxylated nitrile rubber is selected from the group of carboxylated NBR, partly hydrogenated carboxylated NBR and fully hydrogenated carboxylated NBR, or mixtures of two or more of the group members, are preferable for the preparation of the inventive functionalized copolymer rubber containing nitrile groups.

The reaction of the functionalizable copolymer rubbers containing carbonyl groups and nitrile groups with alcohols, epoxides or amines can be effected within a wide temperature range, for example at 50 to 200° C.

The amount of alcohol, epoxide or amine used is typically within the range from 1 to 10 molar equivalents (eq) based on the total amount of α,β-ethylenically unsaturated monomer units containing carbonyl groups.

The glass transition temperatures of the functionalized copolymer rubbers containing nitrile groups prepared by these processes fall by several degrees Celsius even in the case of incomplete conversion of the α,β-ethylenically unsaturated monomer containing carbonyl groups.

Functionalization with Alcohols

The invention therefore further relates to a process for preparing the inventive functionalized copolymer rubbers containing nitrile groups, comprising at least the reaction of functionalizable copolymer rubbers containing carbonyl groups and nitrile groups with alcohols.

Alcohols used may, for example, be $C_1$-$C_{24}$ alcohols, preferably 1,3-diethoxy-2-propanol, 3-hydroxypropionitrile, 3-diethylamino-1-propanol, 1-decanol, 1-pentanol, diethylene glycol methyl ether, triethylene glycol ethyl ether, or methyl polyethylene glycol ether. Particular preference is given to methyl polyethylene glycol ether.

For example, such a process can be conducted in a kneader or an extruder.

In an alternative process, the reaction of the functionalizable copolymer rubbers containing carbonyl groups and nitrile groups is effected with alcohols under acid catalysis in solution.

The reaction of the functionalizable copolymer rubbers containing carbonyl groups and nitrile groups with alcohols under acid catalysis in solution is effected preferably at 80 to 150° C. and more preferably at 100 to 130° C.

The amount of alcohol used in the reaction of the functionalizable copolymer rubbers containing carbonyl groups and nitrile groups with alcohols under acid catalysis in solution is typically in the range from 1 to 10 molar equivalents (eq) based on the total amount of α,β-ethylenically unsaturated monomer units containing carbonyl groups.

The reaction of the functionalizable copolymer rubbers containing carbonyl groups and nitrile groups with alcohols under acid catalysis in solution is effected typically for a period of 1 hour to 48 hours, preferably 2 hours to 24 hours and more preferably 4 hours to 12 hours.

The catalyst used in the case of acid catalysis in solution is, for example, methanesulphonic acid ($MeSO_3H$), p-toluenesulphonic acid or sulphuric acid.

The catalyst loading is, for example, in the range from 0.8 to 2.9 molar equivalents, preferably in the range from 0.8 to 1.4 molar equivalents, based on the total amount of α,β-ethylenically unsaturated monomer units containing carbonyl groups.

The conversion of the functionalizable copolymer rubbers containing carbonyl groups and nitrile groups is typically in the range from 15% to 100%, preferably 40% to 99.9% and more preferably 50% to 99%.

Functionalization with Alcohols in a Kneader

In an alternative embodiment, the reaction of functionalizable copolymer rubbers containing carbonyl groups and nitrile groups with alcohols is effected in solid form in a kneader (e.g.: Haake Rheomix 600). The reaction of functionalizable copolymer rubbers containing carbonyl groups and nitrile groups with alcohols in solid form in the kneader can preferably be effected at temperatures between 160 and 200° C.

The reaction of functionalizable copolymer rubbers containing carbonyl groups and nitrile groups with alcohols in solid form in the kneader is typically effected for a period of 1 to 20 minutes, preferably 1 to 10 minutes.

Functionalization with Epoxides

In an alternative embodiment, the inventive functionalized copolymer rubber containing nitrile groups is prepared by a process comprising the steps of (a) reacting the functionalizable copolymer rubbers containing carbonyl groups and nitrile groups in solution with epoxides and (b) adding a base in stoichiometric amounts to enable the ring opening of the epoxide.

Epoxides used may, for example, be ethylhexyl glycidyl ether or butyl glycidyl ether.

Bases used may, for example, be diisopropylethylamine (Hünig's base), 1,8-diazabicyclo[5.4.0]undec-7-ene (DBU) or pyridine.

The loading with base is, for example, in the range from 1.5 to 10 molar equivalents, preferably in the range from 1.5 to 5 molar equivalents, more preferably in the range from 1.5 to 3 molar equivalents.

The conversion of the functionalizable copolymer rubbers containing carbonyl groups and nitrile groups in the conversion of copolymer rubber containing nitrile groups is 15% or more, preferably 30% or more, more preferably 50% or more.

The preparation of the inventive functionalized copolymer rubbers containing nitrile groups is possible in analogous manner through reaction of functionalizable copolymer rubbers containing carbonyl groups and nitrile groups with amines.

Metathesis

It is also possible that the preparation of the functionalized copolymer rubbers containing nitrile groups is followed by a metathesis reaction to reduce the molecular weight of the functionalized copolymer rubber containing nitrile groups or a metathesis reaction and a subsequent hydrogenation, or a hydrogenation only. These metathesis or hydrogenation reactions are sufficiently well-known to those skilled in the art and are described in the literature. Metathesis is known, for example, from WO-A-02/100941 and WO-A-02/100905 and can be used to reduce the molecular weight.

Hydrogenation

In a further alternative embodiment, the functionalized copolymer rubber containing nitrile groups can be hydrogenated after the functionalization.

The hydrogenation of the functionalized copolymer containing nitrile groups can be conducted in any manner known to those skilled in the art. Suitable processes for hydrogenation of copolymer rubbers containing nitrile groups are described, for example, in U.S. Pat. No. 3,700,637, DE-A 2 539 132, DE A 3 046 008, DE A 3 046 251, DE A 3 227 650, DE A 3 329 974, EP A-111 412, FR-B 2 540 503 and U.S. Pat. No. 4,503,196. Hydrogenated copolymer rubbers containing nitrile groups are notable for high breaking strength, low abrasion, consistently low deformation after pressure and tensile stress, and good oil resistance, but in particular for remarkable stability against thermal and oxidative influences.

The hydrogenation can be conducted in solution, in emulsion or in solid form.

Vulcanizable Mixture Comprising Copolymer Rubber Containing Nitrile Groups

The present invention further provides vulcanizable mixtures comprising the functionalized copolymer rubber containing nitrile groups and at least one crosslinker. A preferred embodiment concerns vulcanizable mixtures which additionally comprise at least one filler.

Other Optional Components:

Optionally, vulcanizable mixtures of this kind may also comprise one or more familiar additives and fibrous materials to the person skilled in the art for rubbers. These include ageing stabilizers, reversion stabilizers, light stabilizers, antiozonants, processing aids, plasticizers, mineral oils, tackifiers, blowing agents, dyes, pigments, waxes, resins, extenders, fillers, carbon blacks, silicas, fumed silica, natural materials, for example clay, kaolins, wollastonite, organic acids, vulcanization retardants, metal oxides, aramid fibres, salts of unsaturated carboxylic acids, for example zinc dimethylacrylate (ZDMA), liquid acrylates, and further filler-activators, for example triethanolamine, trimethylolpropane, polyethylene glycol, hexanetriol, aliphatic trialkoxysilanes or other additives known in the rubber industry (Ullmann's Encyclopedia of Industrial Chemistry, VCH Verlagsgesellschaft mbH, D-69451 Weinheim, 1993, vol A 23 "Chemicals and Additives", p. 366-417).

Useful crosslinkers include, for example, peroxidic crosslinkers such as bis(2,4-dichlorobenzyl) peroxide, dibenzoyl peroxide, bis(4-chlorobenzoyl) peroxide, 1,1-bis(t-butylperoxy)-3,3,5-trimethylcyclohexane, tert-butyl perbenzoate, 2,2-bis(t-butylperoxy)butene, 4,4-di-tert-butyl peroxynonylvalerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)-3-hexyne.

It may be advantageous to use, as well as these peroxidic crosslinkers, also further additions which can help to increase the crosslinking yield: Suitable examples thereof include triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, zinc acrylate, zinc diacrylate, zinc methacrylate, zinc dimethacrylate, 1,2-polybutadiene or N,N'-m-phenylenedimaleimide.

The total amount of the crosslinker(s) is typically in the range from 1 to 20 phr, preferably in the range from 1.5 to 15 phr and more preferably in the range from 2 to 10 phr, based on the functionalized copolymer rubber containing nitrile groups.

Crosslinkers used may also be sulphur in elemental soluble or insoluble form, or sulphur donors.

Useful sulphur donors include, for example, dimorpholyl disulphide (DTDM), 2-morpholinodithiobenzothiazole (MBSS), caprolactam disulphide, dipentamethylenethuram tetrasulphide (DPTT) and tetramethylthiuram disulphide (TMTD).

In the case of sulphur vulcanization of the inventive copolymer rubber containing nitrile groups too, it is possible to use further additions which can help to increase the crosslinking yield. In principle, the crosslinking can also be effected with sulphur or sulphur donors alone.

Conversely, crosslinking of the inventive copolymer rubbers containing nitrile groups can also be effected in the presence of the abovementioned additions only, i.e. without addition of elemental sulphur or sulphur donors.

Suitable additions which can help to increase the crosslinking yield are, for example, dithiocarbamates, thiurams, thiazoles, sulphenamides, xanthogenates, guanidine derivatives, caprolactams and thiourea derivatives.

Dithiocarbamates used may be, for example: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethyldithiocarbamate and zinc diisononyldithiocarbamate.

Thiurams used may be, for example: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

Thiazoles used may be, for example: 2-mercaptobenzothiazole (MBT), dibenzothiazyl disulphide (MBTS), zinc mercaptobenzothiazole (ZMBT) and copper 2-mercaptobenzothiazole.

Sulphenamide derivatives used may be, for example: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxydiethylenethiocarbamyl-N-tert-butylsulphenamide and oxydiethylenethiocarbamyl-N-oxyethylenesulphenamide.

Xanthogenates used may be, for example: sodium dibutylxanthogenate, zinc isopropyldibutylxanthogenate and zinc dibutylxanthogenate.

Guanidine derivatives used may be, for example: diphenylguanidine (DPG), di-o-tolylguanidine (DOTG) and o-tolylbiguanide (OTBG).

Dithiophosphates used may be, for example: zinc dialkyldithiophosphates (chain length of the alkyl radicals $C_2$ to $C_{16}$), copper dialkyldithiophosphates (chain length of the alkyl radicals $C_2$ to $C_{16}$) and dithiophosphoryl polysulphide.

A caprolactam used may be, for example, dithiobiscaprolactam.

Thiourea derivatives used may be, for example, N,N'-diphenyithiourea (DPTU), diethylthiourea (DETU) and ethylenethiourea (ETU).

Likewise suitable as additions are, for example: zinc diaminediisocyanate, hexamethylenetetramine, 1,3-bis(citraconimidomethyl)benzene and cyclic disulphanes.

The additions and also the crosslinking agents mentioned can be used either individually or in mixtures. Preference is given to using the following substances for the crosslinking of the functionalized copolymer rubbers containing nitrile groups: sulphur, 2-mercaptobenzothiazole, tetramethylthiuram disulphide, tetramethylthiuram monosulphide, zinc dibenzyldithiocarbamate, dipentamethylenethiuram tetrasulphide, zinc dialkyldithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinking agents and aforementioned additions can each be used in amounts of about 0.05 to 10 phr, preferably 0.1 to 8 phr, especially 0.5 to 5 phr (single dose, based in each case on the active substance), based on the copolymer rubber containing nitrile groups.

In the inventive sulphur crosslinking, it may also be advisable, in addition to the crosslinking agents and the abovementioned additions, also to use further inorganic or organic substances as well, for example: zinc oxide, zinc carbonate, lead oxide, magnesium oxide, calcium oxide, saturated or unsaturated organic fatty acids and zinc salts thereof, polyalcohols, amino alcohols, for example triethanolamine, and amines, for example dibutylamine, dicyclohexylamine, cyclohexylethylamine, polyamines and polyether amines.

In the case of crosslinking with polyamines, for example, the free carboxyl groups of the additional monomer units are converted. The polyamine is not restricted in any particular way, provided that the crosslinker has at least two or more amino groups or is a substance that generates two or more amino groups in situ. Crosslinker in which a plurality of hydrogens of an aliphatic or aromatic hydrocarbon are replaced by amino groups or hydrazide structures (represented as "—$CONHNH_2$" where CO is a carbonyl group) is preferred. Examples of polyamine crosslinkers include, by way of example, the following:

aliphatic polyamines, preferably hexamethylenediamine, hexamethylenediamine carbamate, tetramethylenepentamine, hexamethylenediamine-cinnamaldehyde adducts or hexamethylenediamine dibenzoate salts;

aromatic polyamines, preferably 2,2-bis(4-(4-aminophenoxy)phenyl)propane, 4,4'-methylenedianiline, m-phenylenediamine, p-phenylenediamine, 4,4'-(4,4'-isopropylidenediphenyl-1,1'-diyldioxy)dianiline;

or 4,4'-methylenebis(o-chloroaniline);

substances having at least two hydrazine structures, preferably isophthalic dihydrazide, adipic dihydrazide or sebacic dihydrazide.

Particularly preferred polyamines are hexamethylenediamine, hexamethylenediamine monocarbamate and 4,4'-(4,4'-isopropylidenediphenyl-1,1'-diyldioxy)dianiline. The amount of polyamine crosslinker in the vulcanizable mixture is in the range from 0.2% to 20% by weight, preferably in the range from 1% to 15% by weight and more preferably in the range from 1.5% to 10% by weight, based on 100% by weight of polymer.

Process for Producing a Vulcanizable Mixture Comprising Functionalized Copolymer Rubber Containing Nitrile Groups The invention further provides a process for producing vulcanizable mixtures comprising functionalized copolymer rubber containing nitrile groups by mixing the functionalized copolymer rubber containing nitrile groups with at least one crosslinker and the further components optionally present. This mixing operation can be performed in all mixing units customary in the rubber industry, for example internal mixers, Banbury mixers or rollers. The sequence of metered addition can be determined without any problem by the person skilled in the art through suitable tests.

By way of example, two variants for the possible procedure are described hereinafter Process A: Production in an Internal Mixer Preference is given to internal mixers with "intermeshing" rotor geometry.

At the start time, the Internal mixer is charged with the functionalized copolymer rubber containing nitrile groups in bale form, and the bales are comminuted. After a suitable mixing period, the fillers and additives are added. The mixing is effected under temperature control, with the proviso that the mixture remains at a temperature in the range from 130 to 150° C. for a suitable time. After a further suitable mixing period, the further mixture constituents are added, such as optionally stearic acid, antioxidants, plasticizers, white pigments (for example titanium dioxide), dyes and other processing actives. After a further suitable mixing period, the Internal mixer is vented and the shaft is cleaned. After a further suitable period, the internal mixer is emptied to obtain the vulcanizable mixture. Suitable periods are understood to mean a few seconds to a few minutes. The vulcanizable mixtures thus produced can be assessed in a customary manner, for instance by Mooney viscosity, by Mooney scorch or by a rheometer test.

Process B: Production on a Roll

If rolls are used as mixing units, it is possible to proceed in an analogous manner and sequence in the metered addition.

Process for Producing Vulcanizates Comprising Functionalized Copolymer Rubber Containing Nitrite Groups The invention further provides the process for producing vulcanizates comprising functionalized copolymer rubbers containing nitrile groups (vulcanization), characterized in that the vulcanizable mixtures comprising functionalized copolymer rubbers containing nitrile groups are subjected to vulcanization, preferably at temperatures in the range from 100° C. to 250° C., more preferably at temperatures in the range from 120° C. to 190° C. and most preferably of 130° C. to 180° C. For this purpose, the vulcanizable mixtures are processed further with calenders, rolls or extruders. The preformed mass is then vulcanized in presses, autoclaves, hot air systems or in what are called automatic mat vulcanization systems ('Auma'), and useful temperatures have been found to be in the range from 120° C. to 200° C., preferably 140° C. to 190° C. The vulcanization time is typically 1 minute to 24 hours and preferably 2 minutes to 1 hour. Depending on the shape and size of the vulcanizates, a second vulcanization by reheating may be necessary to achieve complete vulcanization.

Vulcanizates

The invention further provides the vulcanizates thus obtainable, based on functionalized copolymer rubbers containing nitrile groups. The vulcanizates may take the form of moulded articles, which can be used, for example, as belts, rollers, shoe components, gaskets, hoses, damping elements, stators or cable sheaths, preferably drive belts.

The aforementioned processes for producing the vulcanizates can be used for production of mouldings of any kind.

Inventive vulcanizates typically have oil swelling in IRM 903 (150° C., 168 h) of 0% to 50%, preferably 5% to 30% and more preferably 8% to 15%.

Use

The invention also provides for the use of the vulcanizates based on inventive functionalized copolymer rubber containing nitrile groups for production of shaped bodies, preferably of those which are produced by extrusion or injection moulding.

Mouldings

The invention further provides mouldings based on the inventive functionalized copolymer rubbers containing nitrile groups. The methods usable by way of example for this purpose such as moulding, injection moulding or extrusion processes, and the corresponding injection moulding apparatuses or extruders, are sufficiently well known to those skilled in the art. In the production of these mouldings, it is possible to supplement the inventive copolymer rubbers containing nitrile groups with the standard auxiliaries which are known to those skilled in the art and have to be suitably selected using customary art knowledge, for example fillers, filler-activators, accelerators, crosslinkers, antiozonants, antioxidants, processing oils, extender oils, plasticizers, activators or scorch inhibitors.

The particular advantage of the Invention is that the reaction of functionalizable copolymer rubber containing carbonyl groups and nitrile groups with functionalizable reagents produces novel functionalized copolymer rubber types containing nitrile groups, which typically have a lower glass transition temperature, combined with equal oil resistance, than conventional types having the same acrylonitrile content through the introduction of polar and flexible side chains.

EXAMPLES

Test Methods

The nitrogen content for determination of the ACN content in the copolymer rubbers containing nitrile groups is determined to OS 01960 by LECO TruSpec. Combustion of the sample weighed out in the CHN machine at about 950° C. in pure oxygen, aliquoting of the combustion gases, absorption of the disruptive components and detection of $N_2$ by TCD (thermal conductivity measurement cell).

The RDB content (residual double bond content) in % is determined by the following FT-IR measurement the IR spectra of the copolymer rubber containing nitrile groups before, during and after the hydrogenation are recorded by means of an IR instrument of the Thermo Nicolet FT-IR spectrometer, AVATAR 360 type. For this purpose, a monochlorobenzene solution of the copolymer rubber containing nitrile groups is applied to an NaCl disc, dried to a film and analysed. The hydrogenation level is determined by means of FT-IR analysis by the ASTM D 567095 method.

The values for the Mooney viscosity (ML1+4@100° C.) are determined in each case by means of a shearing disc viscometer in accordance with DIN 53523/3.

The conversion of the HNBR was checked via 1H NMR measurements. The measurements were conducted in 1,1,2,2-tetrachloroethane-d2 with 128 scans and a delay of 5 seconds on a Bruker DPX400. The incorporation was calculated from the integrals over the appropriate signals.

The molecular weight was determined by gel permeation chromatography (GPC). A modular system was used, having a Shodex RI-71 differential refractometer, S 5200 autosampler (from SFD), column oven (ERC-125), Shlmadzu LC 10 AT pump and a column combination of 3 "mixed-B" columns from Polymer Labs. The solvent used was tetrahydrofuran; the molecular weights present are based on polystyrene standards from PSS (Mainz). The measurements were conducted at 40° C. and a flow rate of 1 ml/min in tetrahydrofuran.

The molecular parameters such as number-average molecular weight $M_n$, mass-average molecular weight $M_w$ and the resulting polydispersity index PDI were determined from the RI signal by means of the "Empower 2 data base" software from Waters.

The glass transition temperature of the copolymer rubber containing nitrile groups was obtained with the aid of a DSC measurement. For this purpose, between 10 and 15 mg of sample were weighed into an aluminium boat and sealed. The boat was heated up twice from −100° C. to 100° C. at a heating rate of 20 K/minute in a Mettler Toledo DSC 821e/STAR SW 11.00 DSC instrument. The glass transition temperature was determined from the second heating curve by the standard method for finding the mean value.

The vulcanization characteristics of the rubber mixtures were determined by monitoring the torque as a function of vulcanization time in a moving die rheometer (MDR 2000E), measuring at an angle of 0.5° and an oscillation frequency of 1.7 Hz at 180° C. for 30 minutes.

For the tensile testing, 2 mm plaques were produced by vulcanization of the vulcanizable mixture at 180° C. The dumbbell-shaped test specimens were punched out of these plaques and tensile strength and elongation were determined to ASTM D2240-81.

Hardness was determined with a durometer to ASTM D2240-81.

To determine oil swelling, dumbbell-shaped test specimens as used for the tensile testing were stored in IRM 903 oil in a closed vessel at 150° C. for 7 days. Thereafter, the samples were measured and weighed, and the volume swelling and increase in mass were determined. Subsequently, tensile strength and elongation were determined to ASTM D2240-81.

The abbreviations given in the tables below have the following meanings:
"RT" room temperature (23±2° C.)
"S min" is the minimum torque of the crosslinking isotherm
"S max" is the maximum torque of the crosslinking isotherm
"delta S" is "S max−S min"
"TS1" is the time by which the Mooney viscosity has increased by one unit after the Mooney viscosity minimum has been attained, compared to the starting point
"TS2" is the time by which the Mooney viscosity has increased by two units after the Mooney viscosity minimum has been attained, compared to the starting point
"t 50" is the time when 50% of S max is attained
"t 90" is the time when 90% of S max is attained
"t 95" is the time when 95% of S max is attained
"M 10" modulus at 10% elongation, measured at RT
"M 25" modulus at 25% elongation, measured at RT
"M 50" modulus at 50% elongation, measured at RT
"M 100" modulus at 100% elongation, measured at RT
"M 300" modulus at 300% elongation, measured at RT
"EB" elongation at break, measured at RT
"TS" tensile strength, measured at RT
"H" hardness, measured at RT The Following Substances were Used in the Examples:

The following chemicals were purchased as commercial products from the companies specified in each case, or originate from production plants of the companies specified.
monochlorobenzene Merck, purity ≥99%
methanol Azelis
diethylene glycol methyl ether Merck, purity ≥98%
triethylene glycol ethyl ether Sigma Aldrich, technical grade product
methoxy polyethylene glycol (mPEG 7) Sigma Aldrich, commercial product having 7 ethylene glycol units
methoxy polyethylene glycol (mPEG 11) BASF (Pluriol A520E), technical grade product, 11 ethylene glycol units
methoxy polyethylene glycol (mPEG 16) BASF (Pluriol A750E), technical grade product, 16 ethylene glycol units
butyl glycidyl ether Merck, purity 95%
ethylhexyl glycidyl ether Sigma Aldrich, purity 98%
1-decanol Merck, purity ≥99%
1-pentanol VWR, technical grade product
3,7-dimethyl-1-octanol Sigma Aldrich, purity ≥98%
3-methyl-1-butanol Sigma Aldrich, purity 98%
pyridine VWR, purity 99.7%
1,8-diazabicyclo[5.4.0]undec-7-ene (DBU) Merck, synthesis quality
methanesulphonic acid Merck, purity ≥99%
polycarboxylic acid Orothan™; Rohm and Haas Europe Trading APS Other Substances Used in the Vulcanizable Composition:
Corax® N330: carbon black, commercially available from Orion Engineered Carbons
Rhenofit® DDA: 70% masterbatch based on octylated diphenylamine, produced by Rheinchemie
Vulkanox® ZMB2/C5: zinc salt of 4- and 5-methyl-2-mercaptobenzothiazole, commercially available from Lanxess
Perkadox® 14-40: di(tert-butylperoxyisopropyl)benzene 40% supported on silica, commercially available from Akzo Nobel Polymer Chemicals BV
TAIC: triallyl isocyanurate, 70% masterbatch, commercially available from Kettlitz Chemie GmbH & Co KG.
Maglite®: magnesium oxide, commercially available from CP Hall.

Hydrogenated Functionalizable Copolymer Rubbers Containing Carbonyl Groups and Nitrile Groups Used:

As basis, two different HNBRs were used.

HNBR_V1: ACN content of 34% by weight, methacrylic acid content of 4.6% by weight, residual double bond content of 3.5%, Mooney viscosity ML(1+4, 100° C.) of 77. The glass transition temperature of the polymer was −19.6° C.

HNBR_V2: ACN content of 34.6% by weight, methacrylic acid content of 5.2% by weight, residual double bond content of 0.3%, Mooney viscosity ML(1+4, 100° C.) of 95.8. The glass transition temperature of the polymer was −25.5° C.

I Preparation of the Functionalized Copolymer Rubbers Containing Nitrile Groups

I.a Esterification of Functionalizable Copolymer Rubber Containing Carbonyl Groups and Nitrile Groups with Alcohols in Solution The rubber is dissolved in monochlorobenzene in a concentration of 7% by weight on an agitator platform. The solution is initially charged in a two-neck flask with condenser, and an excess of the alcohol based on the carboxyl groups to be converted is added. The mixture is heated while stirring. As catalyst, methanesulphonic acid diluted in monochlorobenzene is added to the hot solution, and the reaction mixture is refluxed for 4 to 6 hours. The results of the experiments with HNBR_V1 are shown in Table 1, the results with HNBR_V2 in Table 2.

TABLE 1

Esterification of HNBR_V1 with alcohols in chlorobenzene solution

| Experiment number | Reagent | Amount of reagent | Amount of acid | Time [h] | Incorporated [% by wt.] | Tg [° C.] |
|---|---|---|---|---|---|---|
| #1 | Diethylene glycol methyl ether | 3 eq | 2.9 eq | 4 | 5.5 | −22 |
| #2 | Triethylene glycol ethyl ether | 3 eq | 2.9 eq | 4 | 5.1 | −25 |
| #3 | mPEG7 | 3 eq | 2.9 eq | 4 | 8.0 | −25 |
| #4 | mPEG11 | 3 eq | 0.8 eq | 6 | 5.1 | −24 |
| #5 | mPEG11 | 5 eq | 1.4 eq | 6 | 6.0 | −28 |
| #6 | mPEG11 | 10 eq | 1.4 eq | 6 | 8.5 | −28 |
| #7 | mPEG16 | 3 eq | 2.9 eq | 4 | 8.2 | −22 |

TABLE 2

Esterification of HNBR_V2 with alcohols in chlorobenzene solution

| Experiment number | Reagent | Amount of reagent | Amount of acid | Time [h] | Incorporated [% by wt.] | Tg [° C.] |
|---|---|---|---|---|---|---|
| #8 | mPEG11 | 3 eq | 2.9 eq | 4 | 4.9 | −28 |
| #9 | mPEG11 | 5 eq | 2.9 eq | 6 | 3.8 | −27 |
| #10 | mPEG11 | 5 eq | 1.4 eq | 6 | 5.6 | −28 |

I.b Esterification of Functionalizable Copolymer Rubber Containing Carbonyl Groups and Nitrile Groups with Epoxides in Solution The rubber is dissolved in monochlorobenzene in a concentration of 7% by weight on an agitator platform. The solution is initially charged in a two-neck flask with condenser, and an excess of the epoxide based on the carboxyl groups to be converted and of a non-nucleophilic base are added. The mixture is heated while stirring and the reaction mixture is refluxed for 6 hours. The results are listed in table 3.

TABLE 3

Reaction of HNBR 1 with epoxides in chlorobenzene solution

| Experiment number | Reagent | Amount of reagent | base | Amount of base | Incorporated [% by wt.] | Tg [° C.] |
|---|---|---|---|---|---|---|
| #11 | ethylhexyl glycidyl ether | 3 eq | pyridine | 5 eq | 9.6% | −28 |
| #12 | butyl glycidyl ether | 3 eq | DBU | 5 eq | 9.4% | −24 |
| #13 | butyl glycidyl ether | 3 eq | pyridine | 5 eq | 8.0% | −25 |

Workup of the Polymer Solution by Reprecipitation

After the reaction time has elapsed, the polymer solution is poured into a large excess of methanol while stirring and thus precipitated. The methanol was squeezed out of the material precipitated on an aluminium plate and the solid was dissolved again in monochlorobenzene on the agitator platform. The precipitation was repeated twice and the solid obtained was dried to constant weight in a vacuum drying cabinet at 55° C.

II Production of Vulcanizates of the Hydrogenated Functionalized Copolymer Rubber Containing Nitrile Groups:

Production of the Vulcanizable Mixtures:

TABLE 4

Properties of the copolymer rubbers containing nitrile groups

| Invention | HNBR 1* Experiment #4 | HNBR 2* Experiment #5 |
|---|---|---|
| ACN content [% by wt.] | 32.6 | 32.6 |
| Functionalized monomer unit [% by wt.] | 5.1 | 6 |
| Glass transition temperature Tg [° C.] | −24 | −28 |

| Comparison | HNBR 3 Therban 3407 |
|---|---|
| ACN content [% by wt.] | 34 |
| Functionalized monomer unit [% by wt.] | 0 |
| Glass transition temperature Tg [° C.] | −24 |

TABLE 5

Compositson of the vulcanizable mixtures (inventive functionalized copolymer rubbers containing nitrile groups were indicated with an asterisk*)

| Example Rubber | 1* parts | 2* parts | 3 parts |
|---|---|---|---|
| HNBR 1* | 100 | | |
| HNBR 2* | | 100 | |
| HNBR 3 | | | 100 |
| Other components | phr | phr | phr |
| CORAX N330 | 30 | 30 | 30 |
| RHENOFIT DDA | 1.4 | 1.4 | 1.4 |
| VULKANOX ZMB2/C5 | 0.4 | 0.4 | 0.4 |
| PERKADOX 14-40 | 7 | 7 | 7 |
| TAIC 70% | 1.5 | 1.5 | 1.5 |
| MAGLITE | 2 | 2 | 2 |

All the test mixtures were produced on a mixing roll mill. The diameter of the rolls was 80 mm, the length 200 mm. The rolls were preheated to 40° C.; the speed of the front roll was 16.5 rpm, that of the rear roll 20 rpm, which achieved a friction of 1:1.2.

The rubber was initially charged and mixed for one (1) minute until a smooth milled sheet had formed. Subsequently, first the carbon black, then the additives and finally the crosslinking chemicals were mixed in. The total mixing time was 5 to 8 minutes.

TABLE 6

Crosslinking density of the vulcanizates

| MDR 180° C. | | 1* | 2* | 3 |
|---|---|---|---|---|
| S' min | dNm | 4.37 | 3.33 | 1.41 |
| S' max | dNm | 16.74 | 14.21 | 20.71 |
| S' end | dNm | 16.74 | 14.21 | 20.64 |
| delta S' | dNm | 12.37 | 10.88 | 19.3 |
| TS 1 | s | 46 | 31 | 32 |
| TS 2 | s | 58 | 41 | 41 |
| t 50 | s | 121 | 86 | 117 |
| t 90 | s | 351 | 260 | 330 |
| t 95 | s | 487 | 350 | 426 |

TABLE 7

Physical properties of the unaged vulcanizates

| Tensile test | | 1* | 2* | 3 |
|---|---|---|---|---|
| 2 mm plaques vulcanized at 180° C. for 10 minutes | | | | |
| M 10 | MPa | 1 | 0.7 | 0.6 |
| M 25 | MPa | 2 | 1.4 | 1 |
| M 50 | MPa | 3.5 | 2.3 | 1.4 |
| M 100 | MPa | 8 | 5 | 2.8 |
| M 300 | MPa | — | — | 23.8 |
| EB | % | 262 | 242 | 322 |
| TS | MPa | 35 | 23 | 27 |
| H | ShA | 75 | 70 | 62 |

TABLE 8

Physical properties of the hot air-aged vulcanizates (n.d = not determined)

| Tensile test | | 1* | 2* | 3 |
|---|---|---|---|---|
| Ageing of the vulcanizates in hot air, 168 h at 150° C. | | | | |
| M 10 | MPa | (n.d.) | 1.3 | 0.8 |
| M 25 | MPa | (n.d.) | 2.7 | 1.4 |

TABLE 8-continued

Physical properties of the hot air-aged vulcanizates (n.d = not determined)

| Tensile test | | 1* | 2* | 3 |
|---|---|---|---|---|
| Ageing of the vulcanizates in hot air, 168 h at 150° C. | | | | |
| M 50 | MPa | (n.d.) | 5.4 | 2.1 |
| M 100 | MPa | (n.d.) | 11.8 | 4.8 |
| M 300 | MPa | (n.d.) | — | — |
| EB | % | (n.d.) | 230 | 261 |
| TS | MPa | (n.d.) | 30.1 | 23.7 |
| H | ShA | (n.d.) | 81 | 69 |

TABLE 9

Change in the physical properties of the vulcanizates before and after ageing in hot air

| Change | | 1* | 2* | 3 |
|---|---|---|---|---|
| Ageing of the vulcanizates in hot air, 168 h at 150° C. | | | | |
| Δ EB | % | (n.d.) | −5 | −19 |
| Δ TS | % | (n.d.) | 30 | −12 |
| Δ H | ShA | (n.d.) | 11 | 8 |

TABLE 10

Ageing of the vulcanizates in IRM 903

| Tensile test | | 1* | 2* | 3 |
|---|---|---|---|---|
| Ageing of the vulcanizates in IRM 903, 168 h at 150° C. | | | | |
| M 10 | MPa | 0.8 | 0.8 | 0.4 |
| M 25 | MPa | 1.9 | 1.6 | 0.8 |
| M 50 | MPa | 3.9 | 3.1 | 1.3 |
| M 100 | MPa | 10.4 | 7.7 | 3 |
| M 300 | MPa | — | — | — |
| EB | % | 192 | 217 | 233 |
| TS | MPa | 29.3 | 28.3 | 16.3 |
| H | ShA | 73 | 74 | 54 |

TABLE 11

Change in the physical properties of the vulcanizates before and after ageing in IRM 903

| Change | | 1* | 2* | 3 |
|---|---|---|---|---|
| Ageing of the vulcanizates in IRM 903, 168 h at 150° C. | | | | |
| Δ EB | % | −27 | −10 | −28 |
| Δ TS | % | −17 | 13 | −39 |
| Δ H | ShA | −2 | 4 | −8 |
| Δ V | % | 15 | 8 | 21 |

Oil swelling is much improved in the vulcanizates based on the inventive functionalized copolymer rubbers containing nitrile groups, 1* and 2*, compared to the vulcanizates based on HNBR 3.

What is claimed is:

1. A functionalized copolymer rubber containing nitrile groups, the rubber comprising:
    10% to 60% by weight of an α,β-ethylenically unsaturated nitrile units,
    31% to 89% by weight of a conjugated diene units, and
    1% to 9% by weight of at least one α,β-ethylenically unsaturated monomer
    units containing carbonyl groups, wherein, the α,β-ethylenically unsaturated monomer units comprise:
    units of the general formula (I)

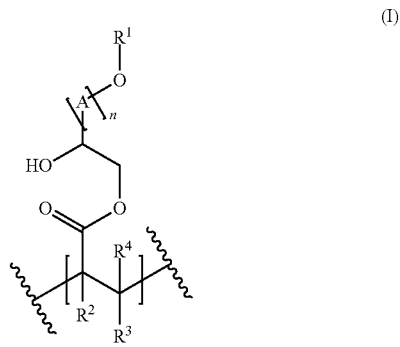

where
    $R^1$ is hydrogen, branched or unbranched C1-C18-alkyl, aryl, cycloalkyl, cyanoalkyl, hydroxyalkyl, aminoalkyl, or polyethylene glycol radical,
    $R^2$, $R^3$ and $R^4$ are each independently hydrogen, methyl or ethyl,
    A is —$CH_2$, and
    n is 1 to 18,
    wherein the rubber has a glass transition temperature lower than
    −20° C., and an oil swelling of not more than 20%.

2. The functionalized copolymer rubber according to claim 1, wherein the conjugated diene units have a level of hydrogenation of 50% or more.

3. The functionalized copolymer rubber according to claim 1, wherein the α, β-ethylenically unsaturated nitrile units are derived from at least one component of the group consisting of: acrylonitrile, methacrylonitrile, ethacrylonitrile, and mixtures thereof.

4. The functionalized copolymer rubber according to claim 1, wherein the conjugated diene units are derived from at least one component of the group consisting of: 1,3-butadiene, isoprene, 2,3-dimethylbutadiene, 1,3-pentadiene (piperylene), and mixtures thereof.

5. A process for preparing the functionalized copolymer rubbers according to claim 1, the process comprising:
    functionalizing a functionalizable copolymer rubber containing carbonyl groups and nitrile groups with alcohols, epoxides or amines, to provide an intermediate rubber, and
    hydrogenating the intermediate rubber.

6. A process for preparing the functionalized copolymer rubbers according to claim 1, the process comprising:
    hydrogenating a functionalizable copolymer rubber containing carbonyl groups and nitrile groups, to produce an intermediate rubber, and functionalizing the intermediate rubber with alcohols, epoxides or amines.

7. A vulcanizable mixture comprising the functionalized copolymerized rubbers according to claim 1 and at least one crosslinker.

8. A process for producing vulcanizable mixtures according to claim 7, the process comprising mixing the functionalized copolymerized rubber with the at least one crosslinker.

9. A process for producing vulcanizates comprising functionalized copolymer rubbers containing nitrile groups, the process comprising vulcanizing the vulcanizable mixtures according to claim 7 at a temperature of 100° C. to 200° C.

10. A vulcanizate comprising the functionalized copolymerized rubbers according to claim 1.

11. A moulding produced by the process according to claim 9.

12. The functionalized copolymer rubber according to claim 1, wherein:
the rubber comprises:
20% to 50% by weight of the α, β-ethylenically unsaturated nitrile units,
42% to 78.75% by weight of the conjugated diene units, and
1.5% to 8% by weight, of the at least one α, β-ethylenically unsaturated monomer units containing carbonyl groups,
the glass transition temperature is lower than −23° C., and
the oil swelling is not more 18%.

13. The functionalized copolymer rubber according to claim 12, wherein:
the conjugated diene units have a level of hydrogenation of 75% or more, and the conjugated diene units are derived from at least one component of a group consisting of 1,3-butadiene, isoprene, 2,3-dimethylbutadiene, 1,3-pentadiene (piperylene), and mixtures thereof, and
the α, β-ethylenically unsaturated nitrile units are derived from at least one component of a group consisting of acrylonitrile, methacrylonitrile, ethacrylonitrile, and mixtures thereof.

14. The functionalized copolymer rubber according to claim 1, wherein:
the rubber comprises:
34% to 43% by weight of the α,β-ethylenically unsaturated nitrile units,
49% to 64.5% by weight of the conjugated diene units, and
1.5% to 8% by weight of the at least one α, β-ethylenically unsaturated monomer units containing carbonyl groups,
the glass transition temperature is lower than −25° C., and the oil swelling is not more 15%.

15. A functionalized copolymer rubber containing nitrile groups, the rubber comprising:
10% to 60% by weight of an α,β-ethylenically unsaturated nitrile units,
31% to 89% by weight of a conjugated diene units, and
1% to 9% by weight of at least one α,β-ethylenically unsaturated monomer units containing carbonyl groups, wherein:
the conjugated diene units have a level of hydrogenation of 85% or more, and the conjugated diene units are derived from 1,3-butadiene,
the α,β-ethylenically unsaturated nitrile units are derived from acrylonitrile, and
the α, β-ethylenically unsaturated monomer units containing carbonyl groups are those of the general formula (I)

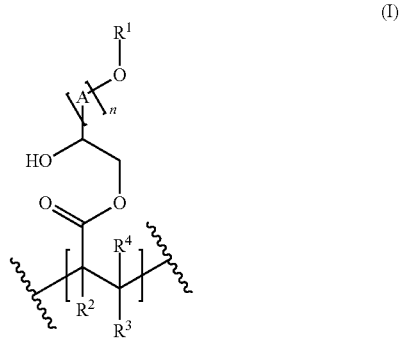

where
$R^1$ is hydrogen, methyl, ethyl, branched or unbranched butyl or 2-ethylhexyl, $C_6$-$C_{14}$-aryl, $C_3$-$C_{18}$-cycloalkyl, $C_1$-$C_{18}$-cyanoalkyl, $C_1$-$C_{18}$-hydroxyalkyl, $C_1$-$C_{18}$ aminoalkyl, methoxy or ethoxy polyethylene glycol radical having 1 to 7 repeat ethylene glycol units,
$R^2$, $R^3$ and $R^4$ are each independently hydrogen, methyl or ethyl,
A is —$CH_2$, and
n is 1.

16. The functionalized copolymer rubber according to claim 15, wherein: the rubber comprises:
34% to 43% by weight of the α,β-ethylenically unsaturated nitrile units,
49% to 64.5% by weight of the conjugated diene units, and
1.5% to 8% by weight of the at least one a,β-ethylenically unsaturated monomer units containing carbonyl groups, and
the rubber has a glass transition temperature lower than −25° C., and an oil swelling of not more 15%.

* * * * *